United States Patent
Brandon et al.

(10) Patent No.: US 6,879,972 B2
(45) Date of Patent: Apr. 12, 2005

(54) METHOD FOR DESIGNING A KNOWLEDGE PORTAL

(75) Inventors: Nancy W. Brandon, Ridgefield, CT (US); Charles R. Cowan, Poughkeepsie, NY (US); Patricia Gongla, Santa Clarita, CA (US); Eric Klein, Montgomery Village, MD (US); Michael A. Limanni, Jr., Bonney Lake, WA (US); Felicia Paduano, Danbury, CT (US); Richard A. Reece, Marietta, GA (US); Christine Rizzuto, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 09/881,820

(22) Filed: Jun. 15, 2001

(65) Prior Publication Data

US 2003/0004982 A1 Jan. 2, 2003

(51) Int. Cl.$^7$ .............................. G06F 17/00; G06N 5/02
(52) U.S. Cl. ............................ 706/45; 706/14; 706/925
(58) Field of Search ............................ 706/925, 14, 45

(56) References Cited

U.S. PATENT DOCUMENTS

| | | | |
|---|---|---|---|
| 5,918,010 A | 6/1999 | Appleman et al. | 709/203 |
| 5,987,440 A | 11/1999 | O'Neil et al. | 705/44 |
| 6,038,668 A | 3/2000 | Chipman et al. | 713/201 |
| 6,078,948 A | 6/2000 | Podgorny et al. | 709/204 |
| 6,144,991 A | 11/2000 | England | 709/205 |
| 6,182,136 B1 | 1/2001 | Ramanathan et al. | 709/224 |
| 6,199,077 B1 | 3/2001 | Inala et al. | 715/501.1 |
| 6,598,054 B2 * | 7/2003 | Schuetze et al. | 707/103 R |
| 6,633,882 B1 * | 10/2003 | Fayyad et al. | 707/101 |
| 2002/0103818 A1 * | 8/2002 | Amberden | 707/205 |
| 2003/0084011 A1 * | 5/2003 | Shetty | 706/13 |
| 2003/0110181 A1 * | 6/2003 | Schuetze et al. | 707/103 R |

OTHER PUBLICATIONS

C. White; Abstract "Decision Threshold"; Intelligent Enterprise; Nov. 16, 1999, vol. 2, No. 16, pp. 34–38, 40.

L. Gates; Abstract, "Infrastructure Critical to Enterprise Portals"; Application Development Trends, Aug. 2000, vol. 7, No. 8, pp. 31–36.

H.J. Ward, M. Gardner; Abstract, Portals—Their Role In The Emerging Networked Economy; Journal of the Institution of British Telecommunications Engineers; Oct.–Dec. 2000; vol. 1, pt. 4, pp. 14–21.

C. Frappaolo, H. Reynolds; Abstract, "Now It's * Personal *[*Web* * portals*]"; Intelligent Enterprise; Nov. 10, 2000, vol. 3, No. 17, pp. 30–38.

* cited by examiner

Primary Examiner—Anthony Knight
Assistant Examiner—Joseph P. Hirl
(74) Attorney, Agent, or Firm—DeLio & Peterson, LLC; Peter W. Peterson; Jay H. Anderson

(57) ABSTRACT

A method for designing a knowledge portal for retrieving, organizing and delivering knowledge to a user belonging to an organization comprises identifying a community of users belonging to the organization characterized by a common interest with respect to the knowledge, and identifying business processes executed by the users in the community in accordance with strategies of the organization. The method then comprises analyzing the business processes to identify specific activities performed in executing the processes and patterns for performing the respective activities, and subsequently constructing the knowledge portal in accordance with the patterns. Analyzing the business processes to identify specific activities performed in executing the processes may be done by developing scenarios for using the portal in performing the respective activities and examining the scenarios to identify the patterns for performing the respective activities.

26 Claims, 2 Drawing Sheets

METHOD FOR DESIGNING A KNOWLEDGE PORTAL

BACKGROUND OF THE INVENTION

1. Field of the Invention

The present invention relates to the design of knowledge portals and, in particular, to designing a knowledge portal for retrieving, organizing and delivering information from computer-based portal data sources to a user belonging to an organization.

2. Description of Related Art

An organization usually has a vast store of knowledge, which may include different forms of public and private data developed within the organization, the knowledge and experience of the organization's communities and employees, and public and private data originating outside the organization. The effective use of this knowledge is critical to the organization's achieving its business objectives. This requires that the right knowledge be readily accessible to individuals within the organization who need that knowledge to perform their duties in support of the organization's objectives.

Individuals within an organization typically cluster into communities such as sales, engineering and manufacturing, whose members share a common base of knowledge, tools, and processes; ways of conceptualizing or organizing that knowledge; and a set of peers with whom they typically network or collaborate. These individuals need, not only access to knowledge, but also the ability to quickly locate the specific knowledge that is directly relevant to the task at hand. However, these users typically have neither the time nor the expertise to: (1) locate all potential sources of the knowledge they need, both within and external to the organization, (2) to quickly identify the precise items of knowledge they are looking for, and (3) to retrieve them from potentially heterogeneous applications.

One way to address these problems is through a knowledge portal. As used herein, a knowledge portal is a computer-based tool that provides knowledge search and retrieval capability to individual knowledge workers who need access to a broad spectrum of knowledge. Ideally, such a knowledge portal retrieves and indexes knowledge from multiple sources and delivers that knowledge to the user organized in a way that is highly relevant and intuitive.

For a knowledge portal to provide the capabilities described above, it must be carefully designed or customized to "know" potentially-relevant sources of knowledge and the most intuitive way to organize that knowledge from the perspective of its individual users, and in the specific business context of the task at hand. Doing so requires a portal design method that strikes an appropriate compromise between the comparatively low relevancy to individual users inherent in an organization-wide "one size fits all" design and the high cost of requiring each individual to invest the resources needed to customize his or her portal.

Bearing in mind the problems and deficiencies of the prior art, it is therefore an object of the present invention to provide an improved method for making the design decisions necessary to create a knowledge portal that will retrieve, organize and deliver computer-based knowledge to a user belonging to an organization from the user's perspective, relevant to the specific business context of the task at hand.

A further object of the invention is to provide a method of designing a knowledge portal that may be used by a community of users in an organization to locate and access critical knowledge for the business processes those communities perform.

It is yet another object of the present invention to provide an improved method of designing a knowledge portal in which decisions made remain in alignment with the strategies and priorities of the organization.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for designing a knowledge portal for retrieving, organizing and delivering knowledge to a user belonging to an organization. The method comprises identifying a community of users belonging to the organization characterized by a common interest with respect to the knowledge, and identifying business processes executed by the users in the community in accordance with strategies of the organization. The method then comprises analyzing the business processes to identify specific activities performed in executing the processes and patterns for performing the respective activities, and subsequently constructing the knowledge portal in accordance with the patterns.

Analyzing the business processes to identify specific activities performed in executing the processes may be done by developing scenarios for using the portal in performing the respective activities and examining the scenarios to identify the patterns for performing the respective activities.

In another aspect. the present invention provides a method for designing a knowledge portal for retrieving, organizing and delivering knowledge to a user belonging to an organization. The method comprises the steps of reviewing strategies of the organization; identifying a community of users characterized by a common interest with respect to the knowledge; identifying business processes executed by the users in the community in accordance with the strategies; analyzing the business processes to identify specific activities performed in executing the processes; developing scenarios for using the portal in performing the respective activities; examining the scenarios to identify patterns therein; and constructing the knowledge portal in accordance with the patterns.

Each scenario associated with a given activity in the aforementioned methods may include a description of the activity, a form of a request likely to be made by users to obtain knowledge relevant to the activity, a description of a result expected by the user in response to the request, and a list of known sources of knowledge that may be used in responding to the request. The common interest of the community of users may be a common base of knowledge, tools and processes; a common way of conceptualizing or organizing that knowledge; or a set of peers with whom the community of users typically network or collaborate.

In the aforementioned methods, the usage scenarios are preferably examined for recurring patterns of requests, such as type of document, support offering, client, industry, technology, collaboration group, application and any other recurring pattern observed in the usage scenario. Further, the known sources of knowledge that may be used in responding to the request may be documents, databases, web sites, or tools accessible via local area network (LAN), the organization's intranet, the external Internet, or other electronic means.

Preferably, the methods include initially identifying business and knowledge strategies of the organization. The identified specific activities and patterns are subsequently continually compared for compatibility with the initially identified business and knowledge strategies of the organization.

In constructing the knowledge portal the data is preferably organized into a hierarchy of categories and subcategories, such as type of document, support offering, client, industry, technology or any other categorization taxonomy that the community identifies as intuitive and natural to use in organizing the knowledge.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
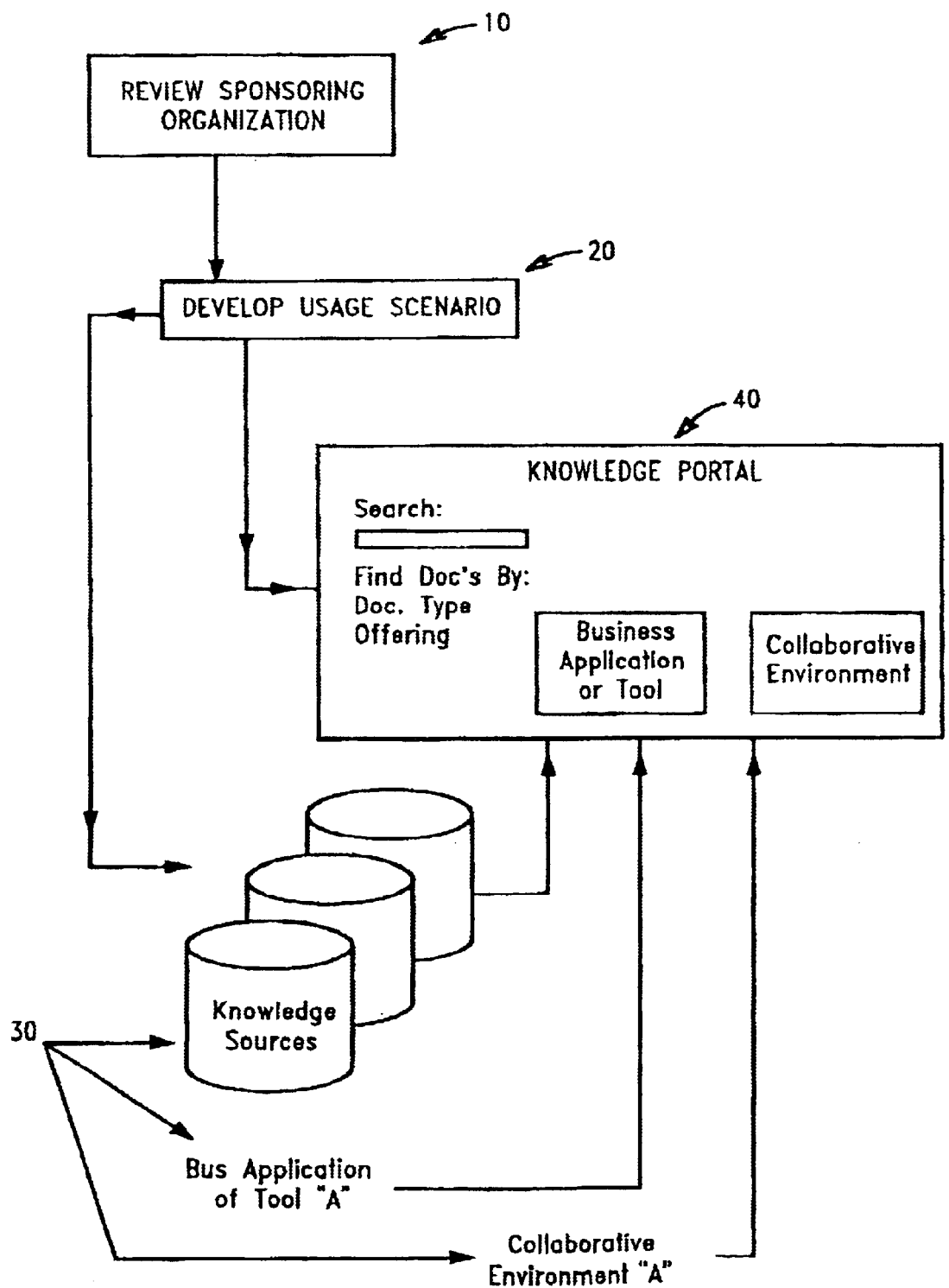
FIG. 1 is a flow chart of the steps employed to practice the preferred embodiment of the method of the present invention.

In describing the preferred embodiment of the present invention, reference will be made herein to FIGS. 1–3 of the drawings in which like numerals refer to like features of the invention. Features of the invention are not necessarily shown to scale in the drawings.

As noted above, a knowledge portal is a computer-based tool that provides information search and retrieval capability to individual knowledge workers who need access to a broad spectrum of knowledge. As detailed below, the method of the present invention permits a knowledge portal 40 (FIG. 1) to be designed so that the portal retrieves and indexes data or content from multiple knowledge sources and delivers that content to the user organized in a way that is highly relevant and intuitive to that user.

In accordance with the present invention, the key challenge an organization faces in designing such a knowledge portal is balancing the need to deliver knowledge in a context that is immediately relevant to each user with the high cost of personalization at the individual user level. The major decisions involved with designing the knowledge portal in the present invention include determining 1) who the portal is really for, 2) what knowledge it should access, 3) where that knowledge resides or gets created, 4) how that knowledge should be structured and customized both for individuals and for groups, 5) how the portal can provide and link collaborative environments, and 6) what business applications should be accessed or integrated.

The present invention provides a unique method for making these design decisions by taking advantage of the characteristics of an organization's communities and by maintaining direct alignment among the organization's business strategies, its communities, its processes, and the content and organization of the portal. In particular, the present invention recognizes and exploits the natural clustering of an organization's knowledge workers into communities whose members share a common base of knowledge, tools, and processes; ways of conceptualizing or organizing that knowledge; and a set of peers with whom they typically network or collaborate. These shared characteristics have been found to correspond closely to the key decisions required to design the knowledge portal. Using a community focus in the portal design effort results in an appropriate compromise between the comparatively low relevancy to individual users inherent in an organization-wide "one size fits all" design and the high cost of requiring each individual to invest the resources needed to customize his or her portal.

Figure 2:
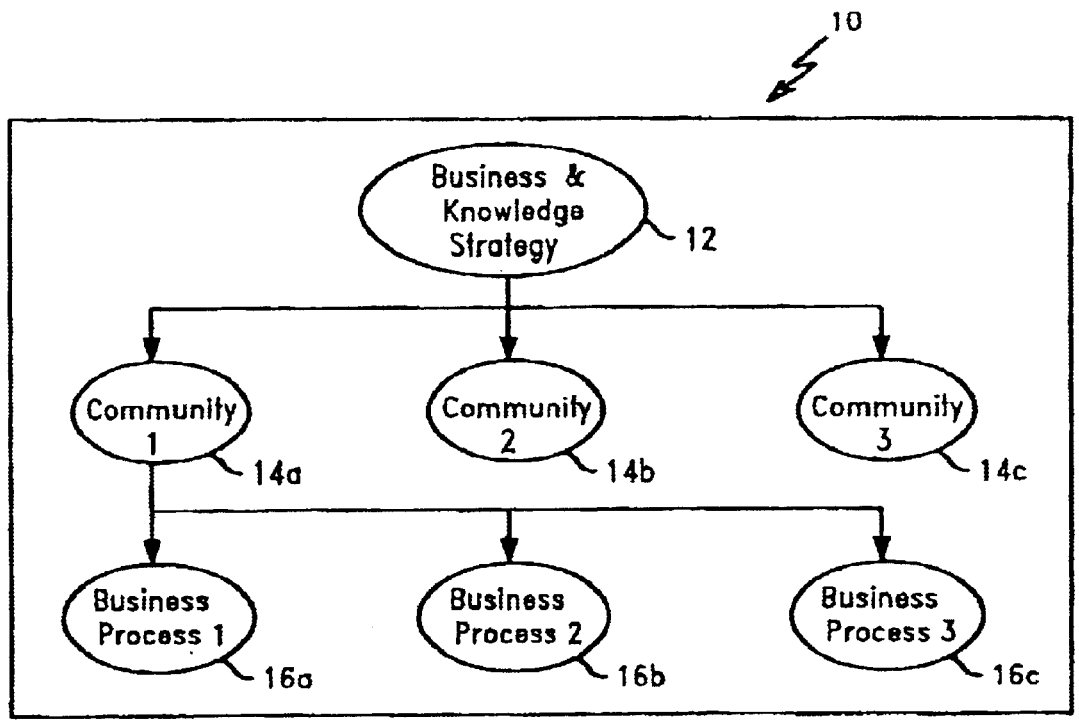
FIG. 2 is a flow chart of a portion of the first step shown in FIG. 1 to practice the preferred embodiment of the method of the present invention.
Figure 3:
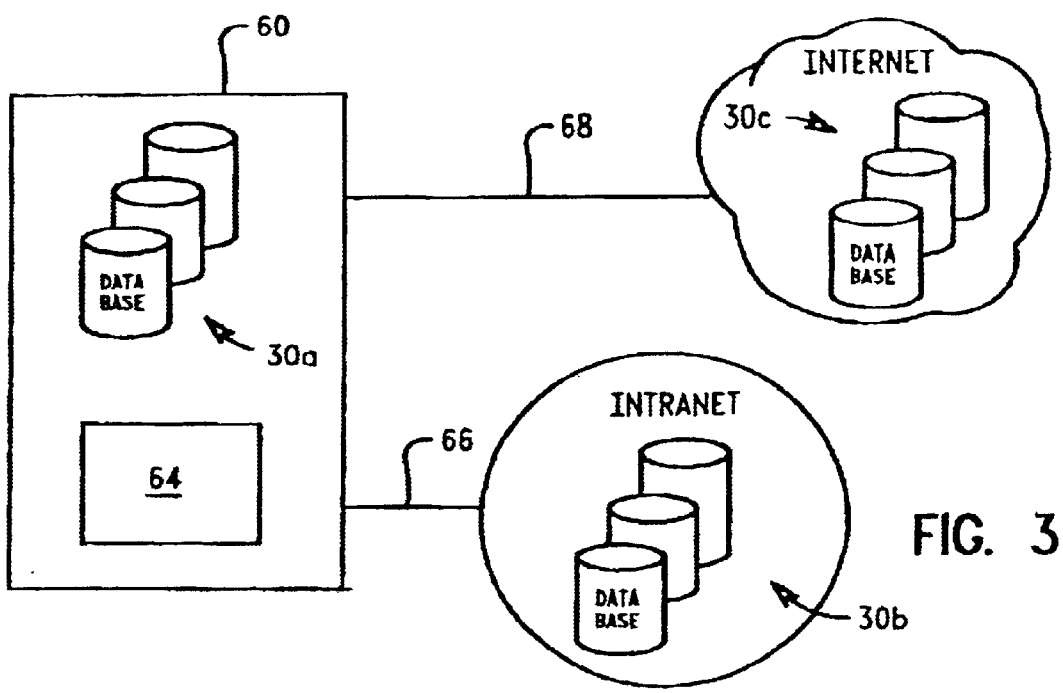
FIG. 3 is a schematic of the system of the present invention employing a computer program to practice the preferred method for designing a knowledge portal for retrieving, organizing and delivering information to a user belonging to an organization.

FIGS. 1 and 2 describe the preferred method of practicing the present invention. The method guides the design process by recognizing and exploiting the clustering of an organization's knowledge workers into communities while also maintaining the alignment among the organization's business strategies, its communities, its processes, and the content and organization of the portal. As shown in FIG. 1, the preferred method of the present invention initially reviews the sponsoring organization's strategies, communities and business processes, 10. FIG. 2 depicts this in more detail, and shows the process beginning with a review of the sponsoring organization's business strategy, knowledge strategy and related priorities, 12. For example, an organization may identify part of its business strategy as improving the effectiveness of its field sales force. The organization may also have a knowledge strategy which identifies critical knowledge (e.g. information about its products, pricing, and customers) and how it is managed in support of its business strategy. These factors-business strategy, knowledge strategy and priorities-set the necessary context for the remaining steps of the method of the present invention.

Once this context has been thoroughly understood, the specific communities 14a, 14b, 14c and business processes 16a, 16b, 16c to be supported by the portal are identified, based on the organization's business and knowledge strategies and priorities. As noted above, the term community refers to a group of users, such as employees or others within or outside of the sponsoring organization, who share a common base of knowledge, tools and processes, a common way of conceptualizing or organizing that knowledge, and a set of peers with whom they typically network or collaborate. The target community may comprise the entire organization, or a subset thereof, such as communities of engineering, sales, or production personnel, or a community of subject matter experts in a particular discipline, as long as the community meets the criteria mentioned above. Note that the term community as used here is based on the shared characteristics of its members and is independent of organizational boundaries: the community may include members from different parts of the organization or even individuals external to the organization.

The organization's business processes 16a, 16b, 16c are those that are executed in order to implement its business strategy. For example, the organization may have to process a request for information (RFI) from an existing or potential customer or to keep the sales community updated on new products being developed by the organization.

The decisions made in item 10 are interrelated. In some cases, the sponsoring organization's strategies and priorities 12 may highlight the need for a portal to support a particular business process 16a, 16b, 16c, which in turn will drive identification of the specific community or communities 14a, 14b, 14c most-directly involved in executing that business process. In other cases, the organization's strategies and priorities may highlight the need for a portal to support a particular community, in which case the selection of the focal community will drive identification of the particular business processes that members of the community execute.

For example, if a strategy or priority of the organization is to improve the effectiveness of its field sales force, the organization may identify its community of field sales representatives as the target user set to design a portal for, and then identify the particular business process (or processes), e.g. "sales", that members of that community execute. Alternatively, the organization may first make the decision to target a business process (e.g. "sales") to be supported by the portal, and then identify the community (or communities) that execute that process, e.g. "field sales representatives".

Each of the identified business processes 16a, 16b, 16c is decomposed into subprocesses and/or specific activities performed in order to execute the process. For example, the "sales" process as executed by this particular community may be decomposed into subprocesses, such as: "Generate lead or initial client contact", "Qualify the prospect", "Develop a proposal", and "Close the sale", and then further decomposed into activities such as "Locate appropriate product descriptions", "Locate good client references", "Locate pricing information", and the like.

The portal's focus continues to be honed by refining the identification of its target community (or communities) and business process (or processes), and by decomposing the target business process (or processes) into subprocesses and activities. Throughout this refinement, as well as through the remainder of the method of the present invention, the alignment of these decisions with the organization's business and knowledge strategies and related priorities is continually revalidated.

Once the activities to be supported by the portal have been identified, the next step is to create one or more usage scenarios 20 (FIG. 1) that describe more specifically how the portal will be used in support of those activities. Usage scenarios typically include: 1) a specific business activity or situation; 2) the specific request a user may make of the portal in support of this particular business activity or situation, stated in the most-likely or most-intuitive way he or she would make that request; 3) the result the user expects from the portal in response to the request; and 4) known sources of information that may be helpful in responding to the request. Such sources may include documents, databases, web sites, or tools accessible via local area network (LAN), the organization's intranet, the external Internet, or other electronic means. Relevant sources of information that are not in a computer-accessible form must be converted, or, at a minimum, abstracted in computer-accessible form, if they are to be included in the portal.

For example, a "Sales" process to be supported by the portal may contain a "Develop a Client Proposal" subprocess, which in turn may include an activity, "Develop Statement of Work to be Included in the Proposal". A usage scenario may be developed to further explore how the portal would support this activity—perhaps to locate a previous relevant Statement of Work to use as a starting point. For example, a specific request that may be made of the portal may be to locate Statements of Work from previous client engagements that involved a particular technical support offering that is to be part of this new proposal. The result the user expects from the portal in response to the request would be one or more Statements of Work from previous client engagements that involve that particular offering. Known sources of information identified as helpful in responding to this type of request may include a client proposal archive database, a web site containing information about each of the company's offerings, a proposal development application, a particular on-line collaborative work environment for sales teams, or even a directory of subject matter experts.

Specifically, the usage scenario may read as follows: (Table 1)

TABLE 1

Usage Scenario 1.1.1
Business Situation:

Process 1: Sales
Subprocess 1.1: Develop a client proposal.
Activity 1.1.1: Develop a statement of work for the proposal.
Looking for a statement of work from a similar engagement to use as a starting point
Specific Request:

Looking for statements of work for a technical support offering
Looking for <kind of document> for <a particular offering>
Desired Result:

One or more statements of work from previous engagements involving this offering
Current Sources:

Client proposal archive database(s)
Web site containing company offering information
Proposal development application
On-line collaborative work environment used by sales teams
Directory of subject matter experts A collection of usage scenarios, representing the range of activities to be supported by the portal, are developed (FIG. 1) and then examined for recurring patterns. The recurring patterns may involve type of document, support offering, client, industry, technology, collaboration group, program application, or any other recurring request by the user. Understanding the form of the user's specific requests helps identify the most intuitive way to organize the knowledge and tools within the portal. For example, if a recurring pattern across the collection of usage scenarios is a user request stated in the form of "I am looking for <kind of document> for <a particular offering>", this may suggest that organizing content by kind of documents (doc type), by offering, or a combination of both may be appropriate. Similarly, understanding the desired results from each scenario, along with where people go to find that information today, helps identify the documents, databases, web sites, business applications or tools, collaborative environments, or other knowledge sources or tools 30 to be made available or integrated via the portal 40.

Once the major categories, or themes, for organizing the data presented by the portal are determined as described above (e.g., "document type" and/or "offering" in the example), the specific taxonomy (or organization scheme) of subcategories under each of the major categories is determined. For example, the "Sales" portal's major category "Offerings" may be organized into a hierarchy of categories and subcategories such as:

Offerings
  Consulting Offerings
    Consulting Offering A
    Consulting Offering B
  Technical Support Offerings
    Technical Support Offering A
    Technical Support Offering B There are a number of different ways to determine the most-appropriate hierarchy of categories and subcategories for organizing a particular major category within the portal. In some cases, the organization or target community may have a formally-established, already-familiar way of organizing its knowledge in a particular area. In other cases, members of the target community may be asked to help identify a taxonomy that would be most helpful or most intuitive for them to organize their knowledge. In still other cases, sophisticated mathematical clustering algorithms (i.e. text mining) may be used to analyze the underlying data to suggest ways in which it can be effectively organized. Regardless of the approach used, the objective is to work with the target community to identify a categorization hierarchy that is simple, intuitive and follows natural patterns of organization for retrieval and storage of knowledge for the target community.

The method of the present invention may be implemented via consultant-facilitated design workshops where the portal design team analyzes user requirements and makes key design decisions for the knowledge portal. By taking advantage of the natural clustering of individual knowledge workers into communities whose members share common characteristics (e.g. the activities they perform, the knowledge they need, and how they most-intuitively organize it) and then making portal design decisions at the level of such a community, the decisions made strike an appropriate compromise between the need to deliver immediate relevancy to each user and the generally high cost of personalization at the individual user level. At each stage of executing the method of the present invention, all assumptions and design decisions being made are evaluated to ensure that they remain in alignment with the original driving strategies and organizational priorities.

The actual knowledge portal for retrieving, organizing and delivering information to a user belonging to an organization may be embodied as a computer program stored on a program storage device. The knowledge portal itself is not a data repository, but is instead a repository of pointers to the data required by the user community. The knowledge portal allows the users to quickly search across all of the data sources or documents available in order to help them quickly locate knowledge relevant to the task at hand. The knowledge portal may be locally sourced, or it may be an Internet or web application. The program storage device containing the knowledge portal program may be devised, made and used as a component of a machine utilizing optics, magnetic properties and/or electronics to perform the method steps of the present invention. Program storage devices include, but are not limited to, magnetic disks or diskettes, magnetic tapes, optical disks, Read Only Memory (ROM), floppy disks, semiconductor chips and the like. As used herein, program storage devices also may be capable of storing databases, used as portal data sources 30 (FIG. 1). A computer readable program code means in known source code may be employed to create the actual knowledge portal for use on a computer. The knowledge portal computer program or software may be stored in any conventional computer, for example, that shown in FIG. 3. Computer 60 incorporates a microprocessor 64 and a program storage device 30*a* containing the program code incorporating the knowledge portal. Such portal data sources 30 (FIG. 1) may include database 30*a*, database 30*b* accessible to the user community's computers through a local area network (LAN) or company intranet connection 66, or data base 30*c* on the Internet accessible through an Internet connection 68. If they are not already in electronic, computer-accessible form, all of the data to be accessed by the knowledge portal should be entered into such form, or at least summarized in such form, in order to yield the desired results.

The present method of designing a knowledge portal may be used by a community of users in an organization to locate and access critical knowledge for the business processes those communities perform. The present invention results in design of a knowledge portal that provides highly-relevant results to its users, by striking an appropriate compromise between the comparatively low relevancy to individual users inherent in an organization-wide "one size fits all" design and the high cost of requiring each individual to invest the resources needed to customize the individual's own portal. It does this by taking advantage of the natural clustering of an organization's knowledge workers into communities of practice whose members share a common base of knowledge, tools, and processes, common ways of conceptualizing or organizing that knowledge, and a set of peers with whom they typically network or collaborate, since these shared characteristics correspond closely to the key decisions required to design the knowledge portal. The present invention further maintains direct alignment among the organization's business strategies, its communities, its processes, and the content and organization of the portal by deriving key portal design decisions from specific usage scenarios, which, in turn, are derived from a step-wise decomposition of the community's business processes, subprocesses and activities.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for designing a knowledge portal for retrieving, organizing and delivering knowledge to a user belonging to an organization, the method comprising identifying a community of users belonging to the organization characterized by a common interest with respect to the knowledge; identifying business processes executed by the users in said community in accordance with strategies of the organization; analyzing the business processes to identify specific activities performed in executing said processes and patterns for performing the respective activities; and constructing the knowledge portal in accordance with said patterns.

2. The method of claim 1 wherein analyzing the business processes to identify specific activities performed in executing said processes is by developing scenarios for using the portal in performing the respective activities and examining said scenarios to identify said patterns for performing the respective activities.

3. The method of claim 2 wherein the usage scenarios are examined for recurring patterns of requests.

4. The method of claim 3 wherein the usage scenarios are examined for recurring patterns of requests selected from the group consisting of type of document, client, industry, technology, collaboration group, application and any other recurring pattern observed in the usage scenario.

5. The method of claim 2 wherein each scenario associated with a given activity includes a description of the activity; a form of a request likely to be made by users to obtain knowledge relevant to the activity; a description of a result expected by the user in response to the request; and a list of known sources of knowledge that may be used in responding to the request.

6. The method of claim 5 wherein the list of known sources of knowledge that may be used in responding to the request is selected from the group consisting of documents, databases, web sites, or tools accessible via local area network (LAN), the organization's intranet, the external Internet, or other electronic means.

7. The method of claim 6 wherein the knowledge portal provides information search and retrieval by indexing content from multiple knowledge source and delivering the content to users in the community.

8. The method of claim 1 wherein said common interest is selected from the group consisting of a common base of knowledge, tools and processes; a common way of conceptualizing or organizing that knowledge; and a set of peers with whom the community of users typically network or collaborate.

9. The method of claim 1 including initially identifying business and knowledge strategies of the organization, and continually comparing the identified specific activities and patterns for compatibility with the initially identified business and knowledge strategies of the organization.

10. The method of claim 1 wherein constructing the knowledge portal includes organizing data into a hierarchy of categories and subcategories.

11. The method of claim 10 wherein the hierarchy of categories and subcategories includes type of document, support offering, client, industry, or technology.

12. The method of claim 10 wherein the hierarchy of categories and subcategories is determined from recurring knowledge retrieval patterns in usage scenarios of the community of users.

13. The method of claim 1 wherein the knowledge portal provides information search and retrieval by indexing content from multiple knowledge source and delivering the content to users in the community.

14. A method for designing a knowledge portal for retrieving, organizing and delivering knowledge to a user belonging to an organization, the method comprising the steps of:

reviewing strategies of the organization;

identifying a community of users characterized by a common interest with respect to the knowledge;

identifying business processes executed by the users in said community in accordance with said strategies;

analyzing the business processes to identify specific activities performed in executing said processes;

developing scenarios for using the portal in performing the respective activities;

examining said scenarios to identify patterns therein; and constructing the knowledge portal in accordance with said patterns.

15. The method of claim 14 wherein each scenario associated with a given activity includes:

a description of the activity;

a form of a request likely to be made by users to obtain knowledge relevant to the activity;

a description of a result expected by the user in response to the request; and a list of known sources of knowledge that may be used in responding to the request.

16. The method of claim 15 wherein the list of known sources of knowledge that may be used in responding to the request is selected from the group consisting of documents, databases, web sites, or tools accessible via local area network (LAN), the organization's intranet, the external Internet, or other electronic means.

17. The method of claim 14 wherein said common interest includes at least one of:

a common base of knowledge, tools and processes;

a common way of conceptualizing or organizing that knowledge; or a set of peers with whom the community of users typically network or collaborate.

18. The method of claim 14 wherein the usage scenarios are examined for recurring patterns of requests.

19. The method of claim 18 wherein the usage scenarios are examined for recurring patterns of requests selected from the group consisting of type of document, client, industry, technology, collaboration group, application and any other recurring pattern observed in the usage scenario.

20. The method of claim 19 wherein the knowledge portal provides information search and retrieval by indexing content from multiple knowledge sources and delivering the content to users in the community.

21. The method of claim 14 including initially identifying business and knowledge strategies of the organization.

22. The method of claim 14 including continually comparing the identified specific activities and patterns for compatibility with the strategies of the organization.

23. The method of claim 14 wherein constructing the knowledge portal includes organizing data into a hierarchy of categories and subcategories.

24. The method of claim 23 wherein the hierarchy of categories and subcategories includes type of document, support offering, client, industry, or technology.

25. The method of claim 23 wherein the hierarchy of categories and subcategories is determined from recurring knowledge retrieval patterns in usage scenarios of the community of users.

26. The method of claim 14 wherein the knowledge portal provides information search and retrieval by indexing content from multiple knowledge sources and delivering the content to users in the community.

* * * * *